United States Patent
Urata et al.

(10) Patent No.: US 9,247,326 B2
(45) Date of Patent: Jan. 26, 2016

(54) SYSTEMS AND METHODS FOR INCREASING BANDWIDTH IN A COMPUTER NETWORK

(71) Applicant: Google Inc., Mountain View, CA (US)

(72) Inventors: Ryohei Urata, San Carlos, CA (US); Hong Liu, Palo Alto, CA (US); Amin Vahdat, Los Altos, CA (US); Christopher Lyle Johnson, San Francisco, CA (US); Junlan Zhou, Sunnyvale, CA (US); Alexander Shraer, San Francisco, CA (US)

(73) Assignee: Google Inc., Mountain View, CA (US)

( * ) Notice: Subject to any disclaimer, the term of this patent is extended or adjusted under 35 U.S.C. 154(b) by 136 days.

(21) Appl. No.: 14/169,734

(22) Filed: Jan. 31, 2014

(65) Prior Publication Data
US 2015/0222969 A1   Aug. 6, 2015

(51) Int. Cl.
*H04Q 11/00* (2006.01)
*G06F 13/40* (2006.01)

(52) U.S. Cl.
CPC ........ *H04Q 11/0062* (2013.01); *G06F 13/4022* (2013.01); *H04Q 2011/0052* (2013.01)

(58) Field of Classification Search
CPC .................. H04Q 11/0062; G06F 13/4022
See application file for complete search history.

(56) References Cited

U.S. PATENT DOCUMENTS

| | | | |
|---|---|---|---|
| 7,539,418 B1 | 5/2009 | Krishnamoorthy et al. | |
| 8,358,932 B2 | 1/2013 | Adhikari | |
| 2010/0151908 A1* | 6/2010 | Skarby et al. | 455/562.1 |
| 2013/0011136 A1 | 1/2013 | Hao et al. | |
| 2014/0119259 A1* | 5/2014 | Nilsson et al. | 370/311 |

FOREIGN PATENT DOCUMENTS

| | | |
|---|---|---|
| EP | 1 231 813 A2 | 8/2002 |
| WO | WO-2013/031267 A1 | 3/2013 |

OTHER PUBLICATIONS

International Search Report and Written Opinion mailed Apr. 23, 2015 in PCT Application No. PCT/US2015/013809.

* cited by examiner

*Primary Examiner* — Leslie Pascal
(74) *Attorney, Agent, or Firm* — Edward A. Gordon; Foley & Lardner LLP

(57) ABSTRACT

Systems and methods for increasing bandwidth in a computer network are provided. A computer network can include a first lower level switch having a first port and a second port. The computer network can include a second lower level switch having a first port and a second port. The computer network can include an upper level switch having respective ports directly coupled to ports of the first and second lower level switches. A third port of the upper level switch can couple to a first port of a passive optical splitter. The passive optical splitter can have second and third ports coupled to respective ports of the first and second lower level switches. The passive optical splitter can be configured to transmit signals received at its first port as output signals on both of its second and third ports.

21 Claims, 8 Drawing Sheets

SYSTEMS AND METHODS FOR INCREASING BANDWIDTH IN A COMPUTER NETWORK

BACKGROUND

Cloud computing-based services are implemented and run on datacenter networks consisting of a large number of individual computers. Typically, it is desirable to deliver as much bandwidth as possible to each computer in the datacenter. However, physically connecting each computer in the datacenter to each other computer can be prohibitively expensive and complex. Furthermore, bandwidth demands within a datacenter can vary greatly as a function of time. Therefore, increasing the number of physical connections alone may not efficiently increase the bandwidth within the datacenter.

SUMMARY OF THE INVENTION

Aspects and implementations of the present disclosure are directed to systems and methods for increasing bandwidth in a computer network.

At least one aspect is directed to a computer network. The computer network includes a first lower level switch having a first port and a second port. The computer network includes a second lower level switch having a first port and a second port. The computer network includes an upper level switch having a first port directly coupled to the first port of the first lower level switch and a second port directly coupled to the first port of the second lower level switch. The computer network also includes a passive optical splitter having a first port coupled to a third port of the upper level switch, a second port coupled to the second port of the first lower level switch, and a third port coupled to the second port of the second lower level switch. The passive optical splitter is configured to transmit signals received at its first port as output signals on both of its second and third ports. The computer network also includes a controller coupled to the first lower level switch, the second lower level switch, and the upper level switch. The controller is configured to control transmission of data by the first lower level switch, the second lower level switch, and the third lower level switch.

At least one aspect is directed to a method for transmitting data in a computer network. The method includes transmitting, by an upper level switch, a first data packet to a first lower level switch over a direct communication link. The method includes transmitting, by the upper level switch, a second data packet to the first lower level switch through an optical splitter coupled to the upper level switch, the first lower level switch, and a second lower level switch by a shared communication link. The method includes transmitting, by the upper level switch, a third data packet to the second lower level switch through the optical splitter.

At least one aspect is directed to a computer-readable medium. The computer-readable medium is encoded with instructions which, when executed by one or more processors, cause the processor to perform a method. The method includes transmitting, by an upper level switch, a first data packet to a first lower level switch over a direct communication link. The method includes transmitting, by the upper level switch, a second data packet to the first lower level switch through an optical splitter coupled to the upper level switch, the first lower level switch, and a second lower level switch by a shared communication link. The method includes transmitting, by the upper level switch, a third data packet to the second lower level switch through the optical splitter.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DESCRIPTION OF CERTAIN ILLUSTRATIVE IMPLEMENTATIONS

Following below are more detailed descriptions of various concepts related to, and implementations of, systems and methods for increasing bandwidth in a computer network. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
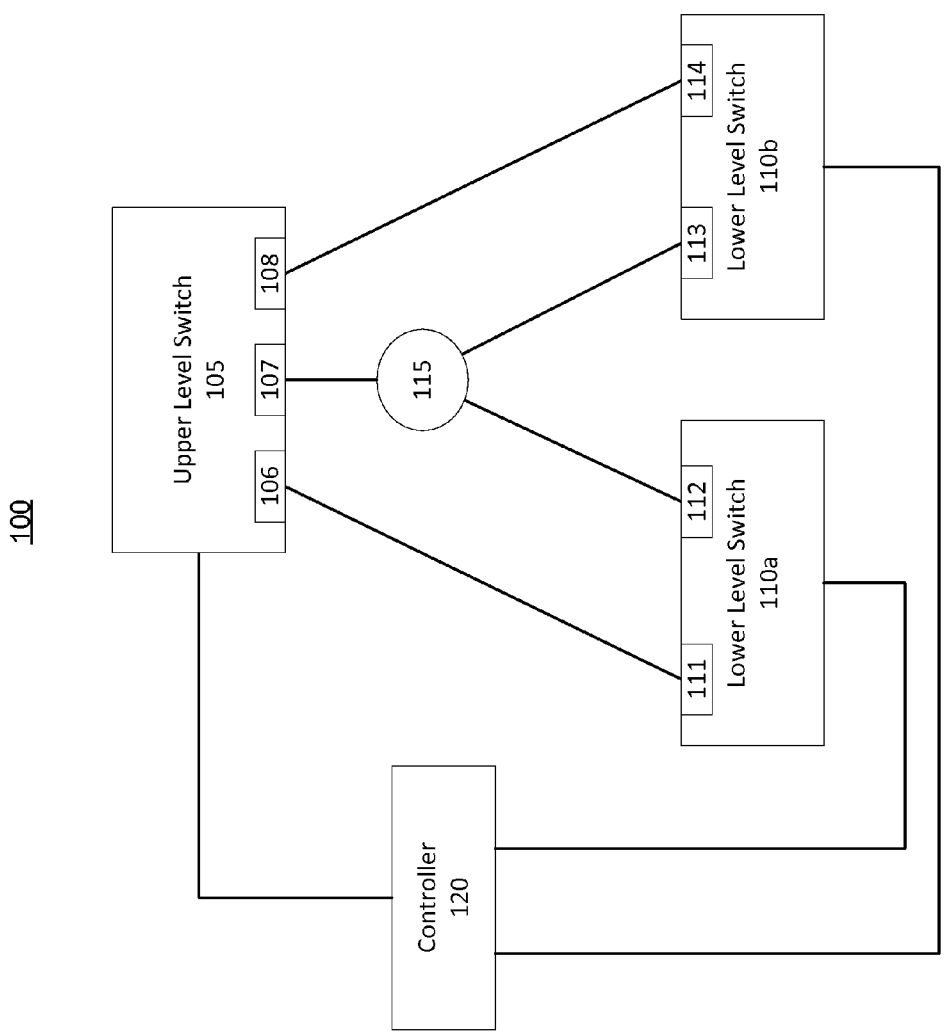
FIG. 1 is an example optical splitter-based computer network.

FIG. 1 is an example optical splitter-based computer network 100. The network 100 includes an upper level switch 105, two lower level switches 110a and 110b (generally referred to as lower level switches 110), a passive optical splitter 115, and a controller 120. Lines joining the upper level switch 105, the lower level switches 110, the optical splitter 115, and the controller 120 represent communication links within the network 100. The upper level switch 105 includes two direct communication links, each coupled to a respective lower level switch 110. A third communication link from the upper level switch 105 couples to the optical splitter 115. The optical splitter 115 is also coupled to each of the lower level switches 110.

One of the direct communication links couples port 111 of the first lower level switch 110a to port 106 of the upper level switch 105. Another direct communication link couples port 114 of the second lower level switch to port 108 of the upper level switch. A shared communication link couples port 107 of the upper level switch to the optical splitter 115. Signals transmitted from port 107 of the upper level switch 105 are divided by the optical transmitter 115 and transmitted to both the first lower level switch 110a (via port 112) and the second lower level switch 110b (via port 113).

In some implementations, the direct communication links from the upper level switch 105 to the lower level switches 110 are formed by multimode fiber optic cables and the communication links from the upper level switch 105 to the optical splitter 115 and from the optical splitter 115 to the lower level switches 110 are formed by single mode fiber optic cables. Multimode fiber optic cables can be less expensive than single mode fiber optic cables. The optical properties of multimode fiber optic cables are well suited for use in direct communication links, and therefore the use of multimode fiber optic cable to form the direct communication links can reduce the overall cost of the network 100. Single mode fiber optic cable can provide more reliable transmission of optical signals divided by passive optical splitters such as the optical splitter 115, relative to multimode fiber optic cable.

The optical splitter 115 permits bandwidth in the network 100 to be reallocated to meet changing bandwidth demands. For example, the optical splitter 115 can receive an optical signal from the upper level switch 105. The optical splitter 115 can then passively output the received signal to both of the lower level switches 110. The bandwidth provided by the shared link through the optical splitter 115 therefore can be allocated to either the first lower level switch 110a or the second lower level switch 110b. In some implementations, the controller 120 can allocate a larger percentage of the bandwidth of the shared link to the lower level switch 110 that is experiencing higher demand for bandwidth. The shared link can be used by both of the lower level switches 110, for example by employing a time domain multiplexing technique for communications between the lower level switches 110 and the upper level switch 105. In some implementations, the 1×2 optical splitter 115 can be implemented using a 2×2 passive optical splitter. A 2×2 passive optical splitter is a commonly used device found in many optical communications networks, and is readily available from several manufacturers. It includes two upper ports and two lower ports. Signals received at either of the upper ports are passed through to both of the lower ports, and signals received at either of the lower ports are passed through to both of the upper ports. To implement the 1×2 optical splitter 115, the unused upper port of a 2×2 optical splitter could be left disconnected. In some implementations, 2×2 optical splitters can be used to implement a single optical splitter having any number of inputs and outputs, as described further below in connection with FIGS. 6A-6B and FIG. 7.

In some implementations, the network 100 represents a datacenter. The network 100 of FIG. 1 is greatly simplified for purposes of this disclosure. A datacenter can include several computing devices interconnected through switches in a hierarchical fashion. For example, the upper level switch 105 or the lower level switches 110 can represent top-of-rack (TOR) switches each connected to a group of computing devices, such as servers. In some implementations, a datacenter includes hundreds or thousands of servers. The switches 110 in the lower level can be connected to each other through upper level switches, such as upper level switch 105, which route data communications between the lower level switches 110 or between the lower level switches 110 and computing devices located outside of the network 100.

As indicated above, the network can include many lower level switches in addition to lower level switches 110a and 110b, and each lower level switch can be coupled to a large number of servers. In some implementations, each server can include at least one processor, memory, and a network interface card (NIC), coupled to one another via a data bus. The processor can execute computer executable instructions stored in the memory to implement a wide variety of operations. For example, the processor of each server can implement operations related to cloud computing services hosted by the network 100 or data storage or access within the network 100.

Relative bandwidth demands for the two lower level switches 110 can vary widely as a function of time. For example, there may be periods during which a large number of users request access to files or applications hosted on servers coupled to the first lower level switch 110a while the servers coupled to the second lower level switch 110b experience relatively few access requests, resulting in a large volume of network traffic to and from the first lower level switch 110a relative to the volume of network traffic of the second lower level switch 110b. During other time periods, these relative bandwidth demands may be reversed, or the bandwidth demands of both lower level switches 110 may be substantially equal. The shared link through the optical splitter 115 provides flexibility in achieving increased bandwidth to a particular lower level switch during different time periods, and is cheaper and less complex than installing physical equipment necessary to achieve full bandwidth to all switches in a static configuration. The direct links from the upper level switch 105 to the lower level switches 110 also provide a minimum guaranteed bandwidth for each lower level switch 110, assuming they do not fail. In some implementations, the direct and/or shared links may be supplemented by additional direct and/or shared links to vary the ratio between fixed and dynamic bandwidth.

Communications from the upper level switch 105 to the optical splitter 115 are transmitted through the optical splitter 115 to both of the lower level switches 110a and 110b. As a result, data packets sent along this link by the upper level switch 105 will be received by both lower level switches 110, regardless of which lower level switch 110 is the intended recipient. Several techniques exist for ensuring that data packets sent along the shared link are received by the correct lower level switch 110 and properly ignored by a switch that is not intended as a recipient.

In some implementations, data packets sent from the upper level switch 105 to the optical splitter 115 can include header information including an indication of the destination switch. Each lower level switch 100 can be assigned a unique identifier. For example, the identifier can be a hardware address such as a MAC address or an IP address associated with a server connected to the lower level switch 110 or with the lower level switch 110 itself. Information corresponding to the unique identifier of the destination for a data packet can be included in the header of the data packet when it is transmitted by the upper level switch 105 to the optical splitter 115. When the packet is transmitted to the lower level switches 110, each lower level switch 110 can compare the identifiers of servers to which it is connected to the identifier contained within the packet header. If there is a match, indicating that the lower level switch 110 is the intended recipient, the lower level switch 110 can process the data packet appropriately, for example by forwarding the data packet to the appropriate server. Otherwise, the lower level switch 110 can discard the data packet.

In other implementations, different modulation formats can be used to transmit packets from the upper level switch 105 to the lower level switches 110 through the splitter 115. For example, the first lower level switch 110a can be configured to receive only packets that are transmitted according to a first modulation format. The second lower level switch 110b can be configured to receive packets that are transmitted in a second modulation format. The upper level switch 105 can transmit data packets destined for the first lower level switch 110a in the first modulation format, and can transmit data packets destined for the lower level switch 110b in the second modulation format. When data is received by each lower level switch 110, the switch 110 can perform a check to determine whether the incoming packet is formatted according to its assigned modulation format, and can process only packets that are of the assigned format. Packets that are formatted differently can be ignored.

Each of the above techniques involves some degree of switch packet processing for each packet received. In other implementations, such packet processing can be avoided. For example, in some implementations, the bandwidth of the shared link through the optical splitter 115 can be allocated according to a multiplexing technique, such as time-division multiplexing (TDM), wavelength-division multiplexing (WDM), code-division multiplexing (CDM), or any other multiplexing technique. For example, a TDM scheme can be used to allocate the bandwidth of the shared link. Separate time slots for transmitting packets to each of the lower level switches 110 can be assigned. The controller 120 can be configured to determine the number, duration, and temporal position of time slots assigned for transmission of packets from the upper level switch 105 to each of the lower level switches 110. The controller 120 can also communicate with the upper level switch 105 and the lower level switches 110 to synchronize the switches, enabling them to adhere to the time-division multiplexing scheme. Given the relatively short distances between switches in a data center context, such synchronization can readily be achieved with a high level of precision. During a time slot reserved for transmissions from the upper level switch 105 to the first lower level switch 110a through the optical splitter 115, the controller 120 can control the second lower level switch 110b to ignore data packets transmitted over the shared link from the optical splitter 115. For example, the controller 120 can control a transceiver of the second lower level switch 110b to "turn off" during a time slot reserved for communication with the first lower level switch 110a. This technique can reduce power consumption, because the second lower level switch 110b does not waste computing power by processing packets that are transmitted during a time slot reserved for communication with the first lower level switch 110a. Similarly, during a time slot reserved for transmissions from the upper level switch 105 to the second lower level switch 110b through the optical splitter 115, the controller 120 can control the first lower level switch 110a to "turn off" so that data packets transmitted through the optical splitter 115 are not received or processed by the first lower level switch 110a during this time period. Note that each lower level switch 110 may continue to receive data via its direct communication link regardless of the time-division scheme, because the destination of data packets received via the direct communication links is unambiguous.

The absolute and relative duration of each time slot may be varied according to changing bandwidth demands. For example, during periods in which the first lower level switch 110a experiences higher bandwidth demand than second lower level switch 110b, the time slots assigned for transmitting packets through the optical splitter 115 to the first lower level switch 110a may be of substantially longer duration than the time slots reserved for transmission of data to the second lower level switch 110b. Alternatively, all time slots may be of substantially equal duration, and a greater number of time slots can be allocated for communication with the first lower level switch 110a to increase its available bandwidth. As bandwidth demands in the network 100 change, the controller 120 can respond by adjusting the relative durations or numbers of time slots reserved for transmission of data to each of the lower level switches 110.

In some implementations, the bandwidth of the shared link can be allocated according to a WDM scheme. Each lower level switch can be assigned a unique range of wavelengths for receiving data packets via the shared link. The upper level switch 105 can be configured to transmit data packets using various wavelengths, and can select the wavelength to be used for each data packet according to the intended destination. For example, in some implementations each lower level switch 110 includes an optical receiver configured to receive optical signals at particular wavelengths that are unique from the wavelengths received by each other lower level switch 110. Therefore, data transmitted to the first lower level switch 110a cannot be received by the lower level switch 110b. In other implementations, there may be some overlap in the wavelengths capable of being received by optical receivers associated with both of the lower level switches 110. In these implementations, the lower level switches can each be assigned a unique wavelength or set of wavelengths, and can be controlled by the controller 120 to ignore data that is not transmitted within their assigned wavelength range.

Therefore, WDM may be employed to logically create direct communication links that pass through the optical splitter 115. For example, multiple wavelengths of light may be transmitted through the optical splitter 115. Each wavelength can represent a separate communication link. One direct communication link from the upper level switch 105 to lower level switch 110a can consist of a single wavelength channel physically transmitted through the optical splitter 115 to the port 112, logically representing a direct communication link between the upper level switch 105 and the lower level switch 110a. Another direct communication link can consist of another single wavelength channel, again physically transmitted through the optical splitter 115, logically representing a direct communication link between the upper level switch 105 and the lower level switch 110b. Finally, a third wavelength can be used to communicate between the upper level switch 105 and both lower level switches 110. In some implementations in which WDM techniques are utilized, transmission of data packets from the upper level switch 105 to both of the lower level switches 110 through the optical splitter 115 may occur simultaneously. Therefore, there may be no need to reserve separate time slots for communication with each of the lower level switches 110.

In some implementations, the shared link through the optical splitter 115 can be bidirectional, allowing the lower level switches 110 to transmit data to the upper level switch 105 through the optical splitter 115. In some implementations, circulators may be positioned between the optical splitter 115 and the lower level switch 110a, the lower level switch 110b, and the upper level switch 105 to facilitate bidirectional communication through a single optical splitter 115, as opposed to using two separate optical splitters, one for downstream communication and another for upstream communication. Any of the allocation techniques discussed above may be applied to communications from the lower level switches 110 to the upper level switch 105. For example, a TDM scheme may be used to allow the first lower level switch 110a to transmit packets through the shared link during specified time slots, while the second lower level switch 110b is permitted to transmit packets during other time slots. Alternatively, the lower level switches 110 may each be assigned a range of wavelengths for transmitting to the upper level switch 105. The controller 120 can be used to determine an appropriate allocation ratio based on bandwidth demands and can control the lower level switches 110 to adhere to the determined allocation. Lower level switches 110 can also transmit data to the upper level switch 105 via their respective direct links. This guarantees a minimum bandwidth for each lower level switch 110, regardless of how the bandwidth of the shared link is allocated.

Figure 2A:
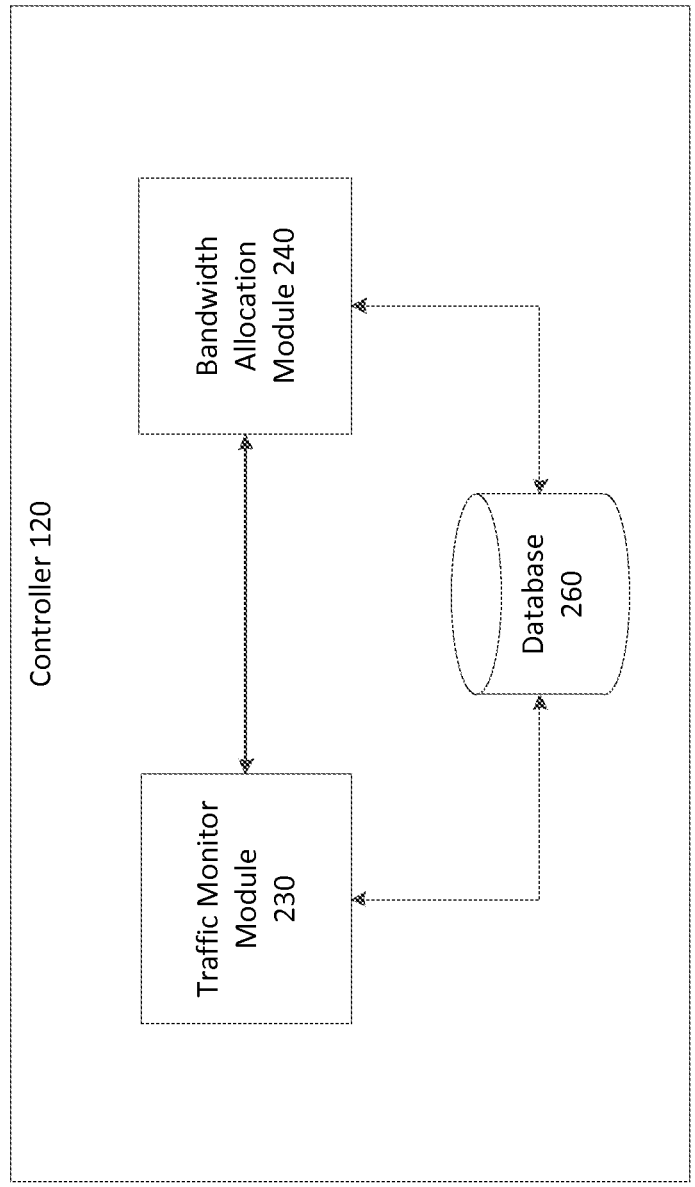
FIG. 2A is a block diagram of the controller shown in FIG. 1, according to an illustrative implementation.

FIG. 2A is a block diagram of the controller 120 shown in FIG. 1, according to an illustrative implementation. The controller 120 includes a traffic monitor module 230, a bandwidth allocation module 240, and a database 260. The components of the controller 120 work to determine network parameters and allocate bandwidth of network links shared through optical splitters, such as the optical splitter 115 shown in FIG. 1. The bandwidth allocation generated by the controller 120 can help to more efficiently route network traffic in a computer network that experiences time-varying changes in bandwidth demand.

The modules of the controller 120 can be implemented in a variety of ways. For example, in some implementations, the traffic monitor module 230 and bandwidth allocation module 240 can be defined by computer instructions executing on a general purpose processor. For example, the traffic monitor module 230 and bandwidth allocation module 240 can be defined by a set of logical operations related to monitoring and provisioning network resources. In other implementations, the traffic monitor module 230 and bandwidth allocation module 240 can be implemented by special purpose logic circuitry, e.g., an FPGA (field programmable gate array) or an ASIC (application-specific integrated circuit). For example, the modules can include a collection of circuitry and logic instructions within an FPGA or ASIC. The modules can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. For example, the traffic monitor module 230, the bandwidth allocation module 240, and the database 260 can include or share one or more data processing apparatuses, computing devices, or processors.

In some implementations, the traffic monitor module 230 can monitor network traffic throughout the network 100. For example, the traffic monitor module 230 can receive from the lower switches 110 and the upper switch 105 information corresponding to current bandwidth usage and the types of network flows each switch is sending and receiving. Alternatively, the traffic monitor module 230 can determine bandwidth demand by monitoring network congestion. The network monitor module 230 can determine that the first lower level switch 110a is more congested than the second lower level switch 110b. For example, congestion can be determined by monitoring the relative number of data packets dropped by each of the lower level switches 110 during a time period. The traffic monitor module can determine that the lower level switch 110 experiencing more dropped data packets requires increased bandwidth.

In some implementations, the bandwidth demands within the network 100 may change over time. For example, the traffic monitor module 230 can determine that, during a first time period, the first lower level switch 110a experiences higher bandwidth demands than the second lower level switch 110b. During a subsequent time period, the traffic monitor module 230 may determine that the second lower level switch 110b experiences higher bandwidth demands than the first lower level switch 110a. In some implementations, the traffic monitor module 230 may recognize patterns in the network traffic as a function of time, and may store information corresponding to the bandwidth demands or recognized patterns in the database 260.

The bandwidth allocation module 240 can determine relative bandwidths to be allocated to the first lower level switch 110a and the second lower level switch 110b. In some implementations, the bandwidth allocation module can adjust the bandwidth allocation by allocating different percentages of bandwidth available on the shared communication link to the first lower level switch 110a and the second lower level switch 110b. The bandwidth allocation can be based on information from the traffic monitor 230. For example, the bandwidth allocation module 240 may communicate directly with the traffic monitor module 230 or may retrieve network traffic information from the database 260. The bandwidth allocation module can then allocate a larger percentage of available bandwidth to the lower level switch experiencing higher demand. In instances in which the bandwidth demands of the two lower level switches are substantially equal, the bandwidth allocation module may allocate about 50% of the shared communication link to each of the two lower level switches 110. The bandwidth allocation determined by the bandwidth allocation module 240 can be stored in the database 260.

The bandwidth allocation module 240 also can communicate with the upper level switch 105 and the lower level switches 110 to ensure that bandwidth is provisioned according to the determined bandwidth allocation. The bandwidth allocation module 240 can control transmission of data in the network 100. In some implementations, the bandwidth allocation module 240 can adjust the relative duration or amount of time slots reserved for communications between the lower level switches 110 and the upper level switch 105 via the optical splitter 115 in a TDM scheme. For example, if the bandwidth allocation module 240 determines that bandwidth should be divided evenly between the two lower level switches 110, the bandwidth allocation module 240 can assign time slots of substantially equal duration to each of the two lower level switches 110. The relative duration of the time slots can be changed according to changes in the bandwidth allocation. In other implementations, the bandwidth allocation module 240 can adjust the bandwidth by other means. For example, the bandwidth allocation module 240 can implement a WDM scheme in which the number of wavelengths available for communicating with each of the two lower level switches 110 is proportional to the bandwidth to be allocated to each switch.

Figure 2B:
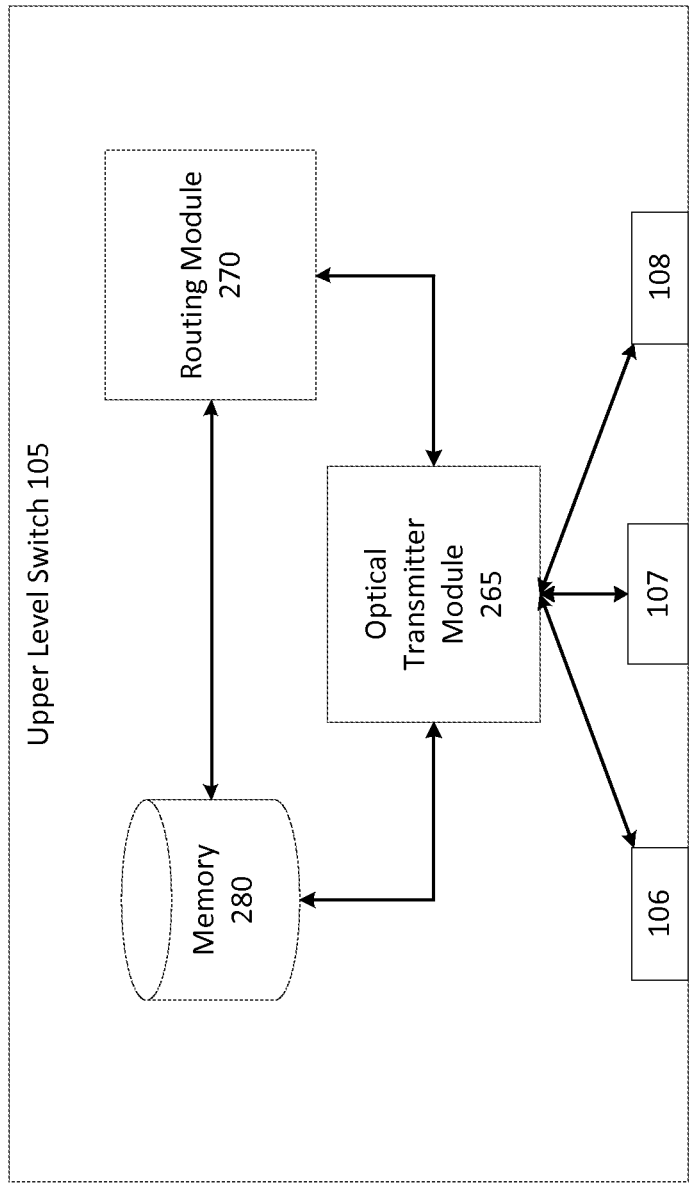
FIG. 2B is a block diagram of the upper level switch shown in FIG. 1, according to an illustrative implementation.

FIG. 2B is a block diagram of the upper level switch 105 shown in FIG. 1, according to an illustrative implementation. The upper level switch 105 includes an optical transmitter module 265, a routing module 270, and a memory 280. The routing module 270 of the upper level switch 105 can be implemented in a variety of ways. For example, in some implementations, the routing module 270 can be defined by computer instructions executing on a general purpose processor. In other implementations, the upper level switch 105 can include special purpose logic circuitry, e.g., an FPGA (field programmable gate array) or an ASIC (application-specific integrated circuit) that implements the routing module 270 and performs other tasks related to transmitting and receiving data packets. In some implementations, the memory 280 can be used to implement a buffer for storing data packets to be transmitted by the upper level switch 105. The memory 280 can also store other information, such as network topology information or a routing table. Although the optical transmitter module 265 is shown as a single unit in FIG. 2B, in some implementations the optical transceiver module 260 may be implemented as separate transceivers each connected to the respective ports of the upper level switch 105.

In some implementations, the routing module 270 can determine whether a data packet should be transmitted to one of the lower level switches 110 using a direct link (i.e., via port 106 or port 108) or using the shared link (i.e., via port 107). For example, the routing module 270 can retrieve a data packet from a stack or queue stored in the memory 280. The routing module 270 can then determine a port through which to transmit the retrieved data packet. In some implementations, the routing module 270 can use information included in the data packet to select a port through which the data packet will be transmitted. The routing module may also communicate with a routing table stored in the memory 280 to select a transmission port for the data packet.

In some implementations, the routing module 270 can use other information to select an appropriate port for transmitting a data packet. For example, the controller 120 can determine a bandwidth allocation for the shared link coupled to port 107, as discussed above. The routing module 270 can use the bandwidth allocation to select a port for transmitting a data packet. In some implementations, the routing module can communicate directly with controller 120 to receive information corresponding to the bandwidth allocation. In other implementations, the controller 120 can transmit information corresponding to the bandwidth allocation to the memory 280, and the routing module 270 can retrieve the information by querying the memory 280.

In some implementations, the routing module 270 can retrieve a data packet from the memory 280 and can first attempt to send the data packet to the intended lower level switch over the respective direct communication link. For example, if bandwidth is available on the direct communication link, the routing module 270 can control the optical transmitter module 265 to transmit the data packet over the respective port coupled to the direct link (i.e., port 106 or port 108). In some implementations, the direct communication link coupled to a given lower level switch may be the preferred path for communication with that switch, and the direct communication link can be used until it is saturated or until a preselected portion of its bandwidth has been used. The routing module 270 can then determine whether bandwidth of the shared communication link is available for communication with the lower level switch, and additional packets can be sent over the shared communication link through port 107.

In other implementations, the direct communication link may not necessarily be the preferred path for communication with a lower level switch. For example, when the bandwidth to a given lower level switch through the direct communication link is substantially equal to the bandwidth available for communication with the switch through the shared communication link, the routing module 270 can implement an equal-cost multi-path (ECMP) routing strategy in which neither communication link is preferred over the other. The routing module 270 can query an ECMP table stored in the memory 280, for example, the determine whether a data packet should be sent to a lower level switch over its respective direct communication link or over the shared communication link.

For instances in which the bandwidth to a given lower level switch through the direct communication link is not equal to the bandwidth available for communication with the switch through the shared communication link, the routing module 270 can implement a weighted-cost multi-path (WCMP) routing strategy to determine whether to send a data packet over the direct communication link or over the shared communication link. For example, the shared communication link may have three times as much bandwidth available for communication with the intended lower level switch as the direct communication link to that switch. The routing module 270 can use this ratio in determining which link to use for a data packet, for example by directing one data packet to the direct communication link for every three data packets directed to the shared communication link.

As discussed above, the optical transmitter module 265 may include several optical transmitters each coupled to a respective port. In some implementations, each port may have more than one transmitter. For example, each port may be coupled to a number of transmitters each configured to transmit optical signals at a different wavelength. The routing module 270 can control each of the transmitters to implement a WDM and/or TDM data transmission scheme.

Figure 3:
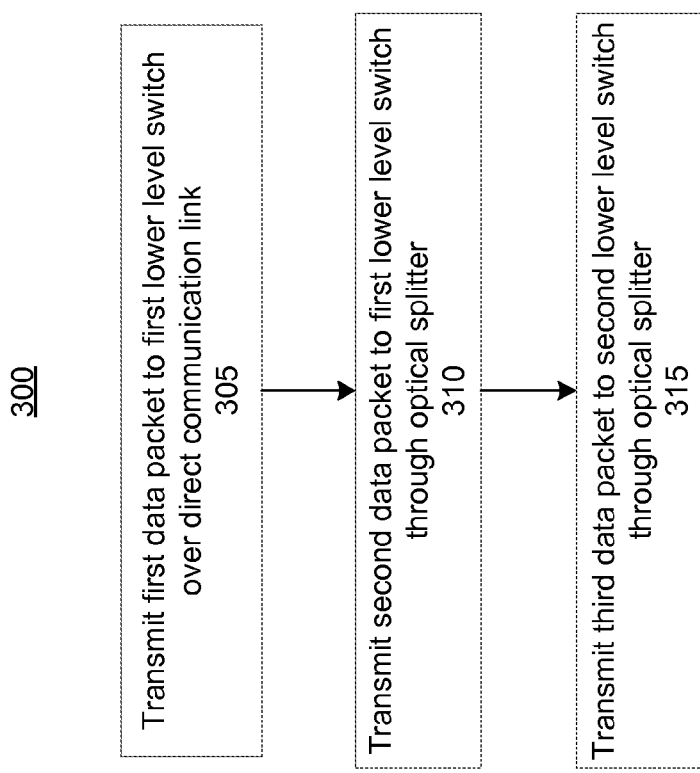
FIG. 3 is a flow diagram of a process for transmitting data in a computer network.

FIG. 3 is a flow diagram of a process 300 for transmitting data in a computer network. The process 300 includes transmitting, by an upper level switch, a first data packet to a first lower level switch over a direct communication link (stage 305). The process 300 includes transmitting, by the upper level switch, a second data packet to the first lower level switch through an optical splitter coupled to the upper level switch by a shared communication link (stage 310). The process 300 includes transmitting, by the upper level switch, a third data packet to a second lower level switch through the optical splitter (stage 315).

The process 300 includes transmitting, by an upper level switch, a first data packet to a first lower level switch over a direct communication link (stage 305). The direct communication link is dedicated to communications between the upper level switch and the first lower level switch. Therefore, there is no risk that the first data packet will be erroneously processed by another computing device and there is no need to transmit the first data packet according to a multiplexing scheme designed to facilitate communications over a shared link. In some implementations, the direct communication link is a multimode fiber optic cable coupled to ports on the upper level switch and the first lower level switch. Multimode fiber optic cables can be less expensive than single mode fiber optic cables. The optical properties of multimode fiber optic cables are well suited for use in direct communication links, and therefore the use of multimode fiber optic cable to form the direct communication link can reduce the overall cost of the network.

The process 300 includes transmitting, by the upper level switch, a second data packet to the first lower level switch through an optical splitter coupled to the upper level switch by a shared communication link (stage 310). The optical splitter can be coupled to both the first lower level switch and a second lower level switch. In some implementations, the optical splitter passively divides the signal received from the upper level switch and transmits the signal to both of the lower level switches. Because the signal is divided by the optical splitter, the communication links from the upper level switch to the optical splitter and from the optical splitter to the first and second lower level switches can be formed by a single mode fiber optic cable. Single mode fiber optic cable can more reliably transmit optical signals divided by passive optical splitters, relative to multimode fiber optic cable. A number of techniques can be used to prevent the second lower level switch from processing the second data packet, which is intended to be processed only by the first lower level switch.

In some implementations, the second data packet can include header information appended to the second data packet. The header information can include information uniquely identifying the first lower level switch as the destination of the data packet. When the second data packet is received from the optical splitter by both the first and second lower level switches, each lower level switch can check the header to determine whether the switch is intended to process the second data packet. The first lower level switch can determine that it is the intended destination and can process the second data packet accordingly. The second lower level switch can determine that it is not the intended destination, and can therefore ignore the data packet.

In other implementations, a multiplexing scheme, such as WDM and/or TDM, can be used to transmit the second data packet. For example, a controller coupled to the upper level switch and the lower level switches can assign one or more wavelengths for communications between the upper level switch and the first lower level switch. In some implementations, the number of wavelengths is determined based on an amount of bandwidth to be allocated to the first lower level switch, relative to the amount of bandwidth reserved for communications between the upper level switch and the second lower level switch, transmitting the second data packet through the optical splitter to the first lower level switch can therefore include transmitting the second data packet at a wavelength that has been reserved for the first lower level switch.

In other implementations, respective time slots can be reserved for communications between the upper level switch and the two lower level switches. Transmitting the second data packet can include transmitting the second data packet during a time slot reserved for the first lower level switch. During this time slot, a receiver associated with the second lower level switch can be turned off to prevent the second lower level switch from processing the second data packet.

The process 300 includes transmitting, by the upper level switch, a third data packet to a second lower level switch through the optical splitter (stage 315). To prevent the third data packet from being erroneously processed by the first lower level switch, the third data packet can include header information uniquely identifying the second lower level switch as the destination of the third data packet. When the third data packet is received from the optical splitter by both the first and second lower level switches, each lower level switch can check the header to determine whether the switch is intended to process the second data packet. The second lower level switch can determine that it is the intended destination and can process the second data packet accordingly. The first lower level switch can determine that it is not the intended destination, and can therefore ignore the data packet.

In other implementations, the controller can assign one or more wavelengths for communications between the upper level switch and the second lower level switch. The number of wavelengths is determined based on an amount of bandwidth to be allocated to the second lower level switch, relative to the amount of bandwidth reserved for communications between the upper level switch and the first lower level switch, transmitting the third data packet through the optical splitter to the second lower level switch can therefore include transmitting the third data packet at a wavelength that has been reserved for the second lower level switch.

In other implementations, respective time slots can be reserved for communications between the upper level switch and the two lower level switches. Transmitting the third data packet can include transmitting the third data packet during a time slot reserved for the second lower level switch. During this time slot, a receiver associated with the first lower level switch can be turned off to prevent the first lower level switch from processing the third data packet.

Figure 4:
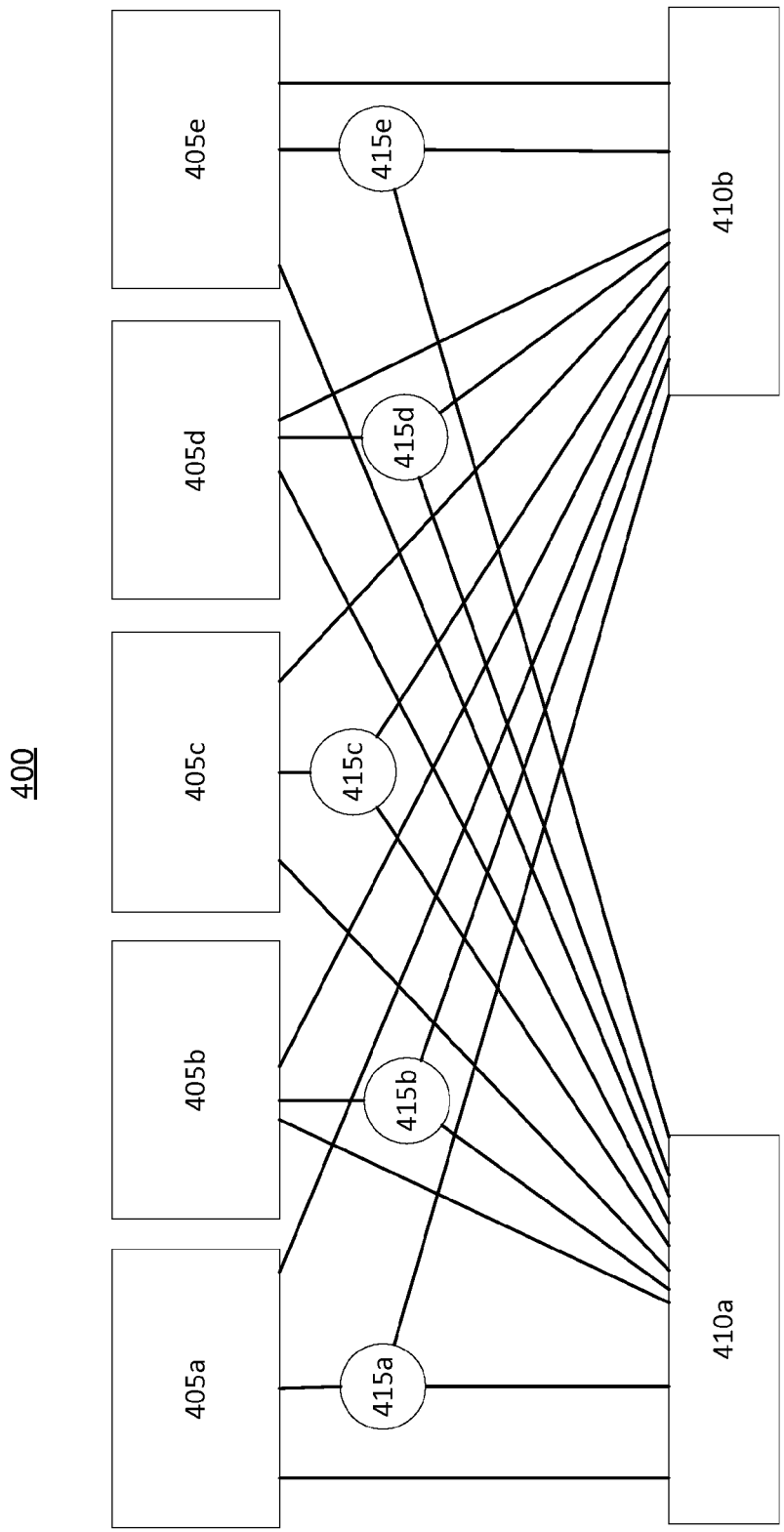
FIG. 4 is an example computer network in which the shared communication links are distributed evenly between lower level switches.

FIG. 4 is an example computer network 400 in which shared communication links are distributed evenly between lower level switches. The computer network 400 includes five upper level switches 405a-405e (generally referred to as upper level switches 405) and two lower level switches 410a and 410b (generally referred to as lower level switches 410). Each upper level switch 405 couples to each lower level switch 410 via a single direct communication link. Each upper level switch 405 also couples to a respective passive optical splitter 415a-415e (generally referred to as optical splitters 415). Each optical splitter 415 passively divides optical signals received from the upper level switches 405 into two output signals so that the received optical signal is transmitted to both of the output communication links through the optical splitters 415.

The outputs of each optical splitter 415 are distributed evenly between the two lower level switches 410. That is, each optical splitter 415 is coupled via a single link to each lower switch 410. This arrangement of communication links delivers potential for equal bandwidth to each of the lower switches 410 on average, while still permitting bandwidth to be adjusted in the network 400 by reallocating the bandwidth of the shared communication links to the lower level switch 410 experiencing the higher bandwidth demand. Although each optical splitter 415 is shown in FIG. 4 as dividing signals received the upper level switches 405 into two output signals, other configurations are possible. For example, the optical splitters 415 may divide input signals received from the upper level switches 405 into three or more signals transmitted to the lower level switches 410. In some implementations, the additional splitter outputs may also be evenly divided between the first lower level switch 410a and the second lower level switch 410b or among more than two lower level switches 410.

The balanced configuration shown in FIG. 4 can be particularly useful in applications in which bandwidth demand between lower level switches 410 is expected to be substantially equal on average over the long term, but may experience short term spikes in bandwidth demanded by the lower level switches 410. Many datacenters exhibit bursts of traffic to and from certain computing devices, and these bursts are typically of short duration and randomly distributed in time. The balanced arrangement of the network 400 can be useful for such a datacenter.

A controller (not shown) such as the controller 120 shown in FIG. 1 and FIG. 2A may be used to allocate bandwidth of the shared links in the network 400. For example, bandwidth may be allocated using a multiplexing scheme such as WDM and/or TDM, as described above. The controller can monitor bandwidth demand for both of the lower level switches 410 and can adjust the allocation of bandwidth for the shared links to more efficiently meet demand. The balanced nature of the network 400 allows the bandwidth to be increased or decreased quickly, while the direct communication links between each upper switch 405 and each lower switch 410 provide a guaranteed minimum bandwidth for each lower switch 410.

Figure 5:
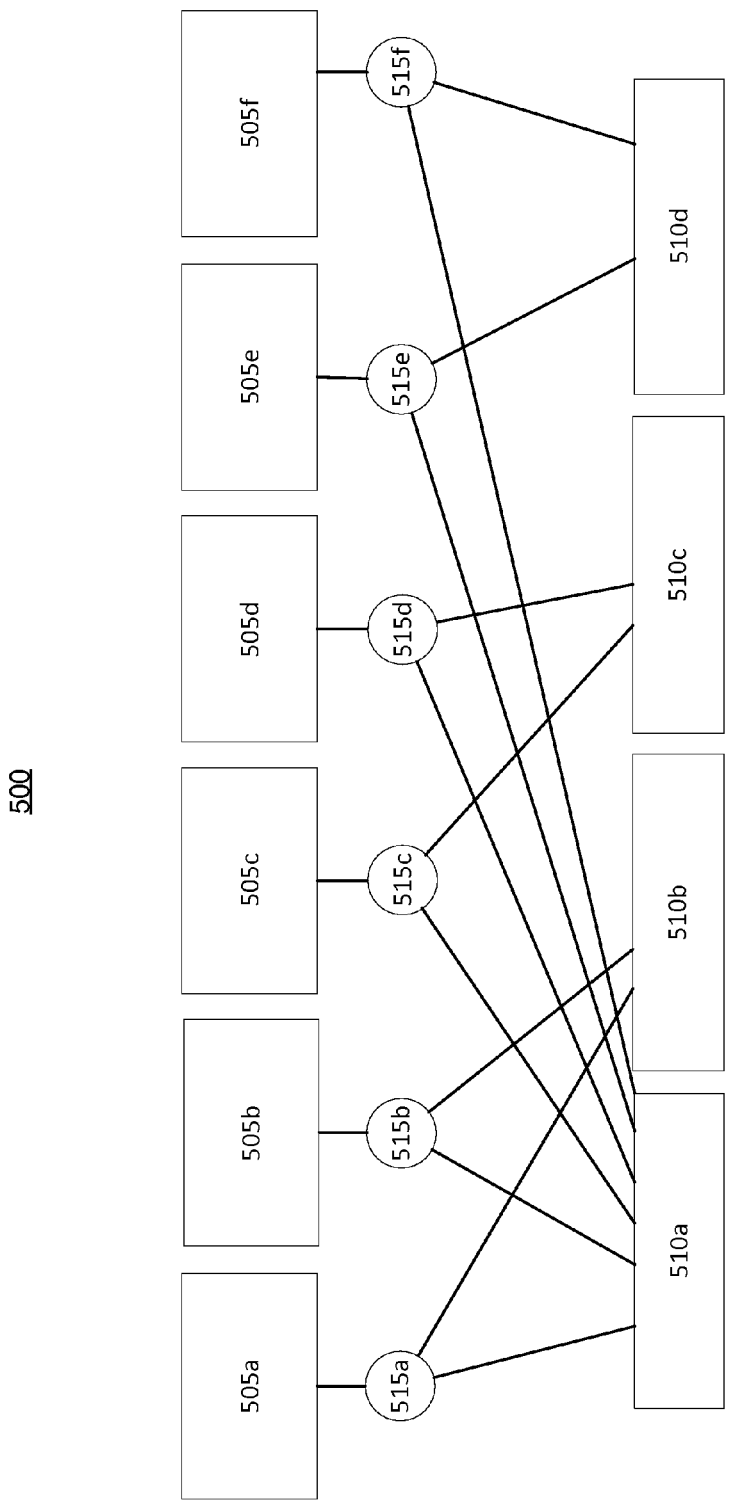
FIG. 5 is an example computer network in which the shared communication links are distributed across more than two lower level switches.

FIG. 5 is an example computer network 500 in which shared communication links are distributed across more than two lower level switches. The network 500 includes six upper level switches 505a-505f (generally referred to as upper level switches 505) and four lower level switches 510a-510d (generally referred to as lower level switches 510). Each upper level switch 505 also couples to a respective passive optical splitter 515a-515f (generally referred to as optical splitters 515). Each optical splitter 515 passively divides optical signals received from the upper level switches 505 into two output signals so that the received optical signal is transmitted to both of the output communication links through the optical splitters 515. For illustrative purposes, no direct communication links are shown between the upper level switches 505 and the lower level switches 510. However, in some implementations, each upper level switch 505 may be coupled to each lower level switch 510 by one or more direct communication links. Such direct communication links can provide a guaranteed minimum bandwidth for each lower level switch 510. In other implementations, the network 500 can include additional optical splitters 515. For example, the additional optical splitters 515 could be configured to each couple to a respective upper level switch 505 and to a pair of lower level switches 510. Bandwidth can be allocated more evenly by including optical splitters 515 that coupled to every pair of lower level switches 510.

The outputs of each optical splitter 515 are distributed unevenly between the lower level switches 510. For example, every optical splitter 515 includes one link to the first lower level switch 510a. However, the other lower level switches 510b-510d each are coupled to only two of the six optical splitters 515. This arrangement delivers more average bandwidth to lower level switch 510a than to lower level switches 510b-510d. Although each optical splitter 515 is shown in FIG. 5 as dividing signals received the upper level switches 505 into two output signals, other configurations are possible. For example, the optical splitters 515 may divide input signals received from the upper level switches 505 into three or more signals transmitted to the lower level switches 510. In some implementations, the additional splitter outputs may also be unevenly divided between the first lower level switch 510a and the second lower level switch 510b in order to increase bandwidth to one of the lower level switches 510.

The uneven configuration shown in FIG. 4 can be useful in applications in which bandwidth demand for lower level switch 510a is expected to consistently exceed bandwidth demand for lower level switches 510b-510d on average over the long term. For example, for computer networks in which data is frequently transferred from each of the lower level switches 510b-510d to the lower level switch 510, or vice versa, the uneven configuration of the network 500 can provide more efficient transfer of data.

In some implementations, a controller (not shown) such as the controller 120 shown in FIG. 1 and FIG. 2A can be used to more efficiently use the communication links of the network 500. For example, for an application requiring bulk transfer of data from the lower level switches 510b-510d to the lower level switch 510a, the controller could allocate the bandwidth of the shared links to permit switches 510b-510c to upload data to the upper level switches 505 during a first time period. During a subsequent time period, the controller could take advantage of the uneven nature of the network 500 by configuring the shared links to permit the upper level switches 505 to download all of the data to the lower level switch 510a. In some implementations, the controller could implement a WDM scheme permit the upload from lower level switches 510b-510d and the download to lower level switch 510a to occur substantially simultaneously.

Figure 6B:
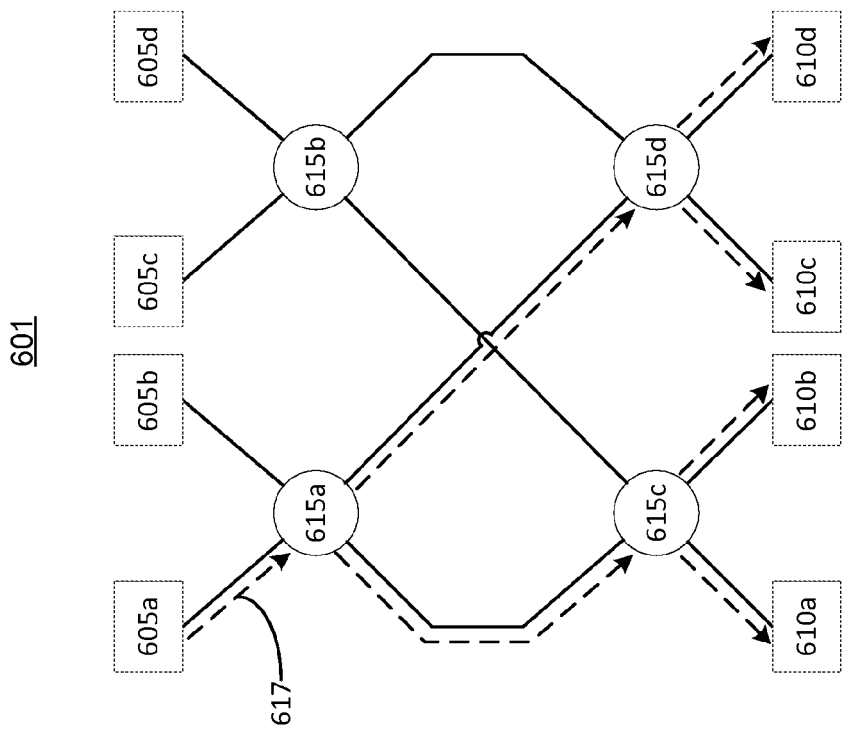
FIG. 6B is an example computer network including four passive optical splitters.
Figure 6A:
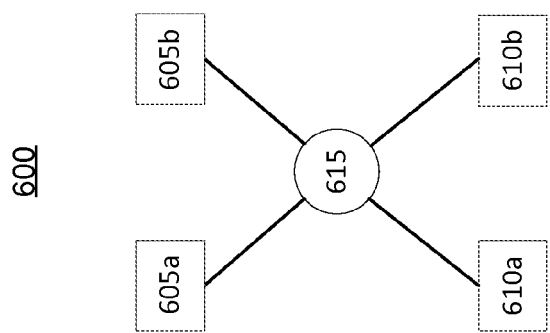
FIG. 6A is an example computer network including a passive optical splitter.

FIG. 6A is an example computer network 600 including a passive optical splitter 615. The network 600 includes two upper level switches 605a and 605b (generally referred to as upper level switches 605) and two lower level switches 610a and 610b (generally referred to as lower level switches 610). The network 600 also includes a passive optical splitter 615. The passive optical splitter 615 includes four communication ports. Each switch in the network 600 is coupled to a respective port of the passive optical splitter 615 by a fiber optic communication link. The optical splitter is configured to passively output signals received from either of the two upper level switches 605 to both of the two lower level switches 610. For example, a signal sent to the optical splitter 615 from the upper level switch 605a can be divided and output to both of the lower level switches 610. Similarly, a signal sent to the optical splitter 615 from the upper level switch 605b also can be divided and output to both of the lower level switches 610.

As discussed above, the 2×2 passive optical splitter 615 is often used in optical networks and is widely available at relatively low cost. In some implementations, the passive optical splitter 615 can be used to implement the three-port optical splitter 115 shown in FIG. 1. For example, the port connected to the upper level switch 605a could be connected to port 107 of the upper level switch 105 of FIG. 1, the port connected to the lower level switch 610a could be connected to port 112 of the lower level switch 110a of FIG. 1, and the port connected to lower level switch 610b could be connected to port 113 of the lower level switch 110b of FIG. 1. Because the optical splitter 115 includes fewer ports than the optical splitter 615, one port of the optical splitter 615 (i.e., the port shown coupled to the upper level switch 605b in FIG. 6A) could simply remain unconnected. Alternatively, this extra port could be connected to another port of the upper level switch 105. Such a redundant communication link could be used to increase reliability in the event that the first link to the upper level switch 105 fails.

The optical splitter 615 can be used in other configurations to implement an optical splitter having any number of input and output ports. For example, as discussed above, the optical splitter 615 can be used to implement a 1×2 optical splitter by leaving one of its upper ports disconnected. In some implementations, several optical splitters 615 can be coupled to one another to implement optical splitters having a greater number of input and output ports. Several examples of networks having additional optical splitters are described below.

FIG. 6B is an example computer network 601 including four passive optical splitters 615a-615d (generally referred to as passive optical splitters 615). The network also includes four upper level switches 605a-605d (generally referred to as upper level switches 605) and four lower level switches 610a-610d (generally referred to as lower level switches 610). Each of the passive optical splitters 615 is similar to the passive optical splitter 615 shown in FIG. 6A. For example, each passive optical splitter 615 includes four ports (i.e., two upper ports and two lower ports) and is configured to transmit a signal received at either of the upper ports to both of the lower ports. In some implementations, the network 601 can represent a simplified datacenter network. For example, the lower level switches 610 can represent top-of-rack switches that can be coupled to other computing devices in the datacenter, such as servers. The upper level switches 605 can be used to facilitate communication between the lower level switches 610 and the computing devices to which they are connected.

The passive optical splitters 615 are coupled to the upper level switches 605, the lower level switches 610, and to two of the three other optical splitters 615. A first lower port of the passive optical splitter 615a is coupled to a first upper port of the passive optical splitter 615c. A second lower port of the passive optical splitter 615a is coupled to a first upper port of the passive optical splitter 615d. A first lower port of the passive optical splitter 615b is coupled to a second upper port of the passive optical splitter 615c. A second lower port of the passive optical splitter 615b is coupled to a second upper port of the passive optical splitter 615d. This configuration allows the passive optical splitters 615 to logically serve as a single optical splitter outputting each signal received from one of the upper level switches 605 to all of the lower level switches 610.

For example, a signal 617 transmitted from the upper level switch 605a can be received by the passive optical splitter 615a. The passive optical splitter 615a can output the received signal 617 on both of its lower ports so that the signal 617 is received by the passive optical splitters 615c and 615d. Likewise, the passive optical splitters 615c and 615d can output the received signal 617 to the lower level switches 610a-610d through their respective lower ports. Therefore, the signal 617 transmitted from upper level switch 605a is transmitted to all of the lower level switches 610a-610d. By the same principles, signals transmitted from any of the other upper level switches 605b-605d will also be received by all of the lower level switches 610a-610d through the passive optical splitters 615. The configuration of the optical splitters 615 shown in FIG. 6B can thus be used to logically implement a single 4×4 optical splitter. In some implementations, additional optical splitters may be added to the network 601 to arbitrarily increase the number of potential inputs and outputs. Any unnecessary input or output ports may be left disconnected or may be used for redundancy, as discussed above.

In some implementations, multiplexing can be used to avoid data collisions in the network 601 and to ensure that data sent from an upper level switch 605 is processed only by the intended lower level switch 610. For example, as discussed above, a TDM, WDM, or other multiplexing scheme can be used to transmit and receive data over the network 601.

Figure 7:
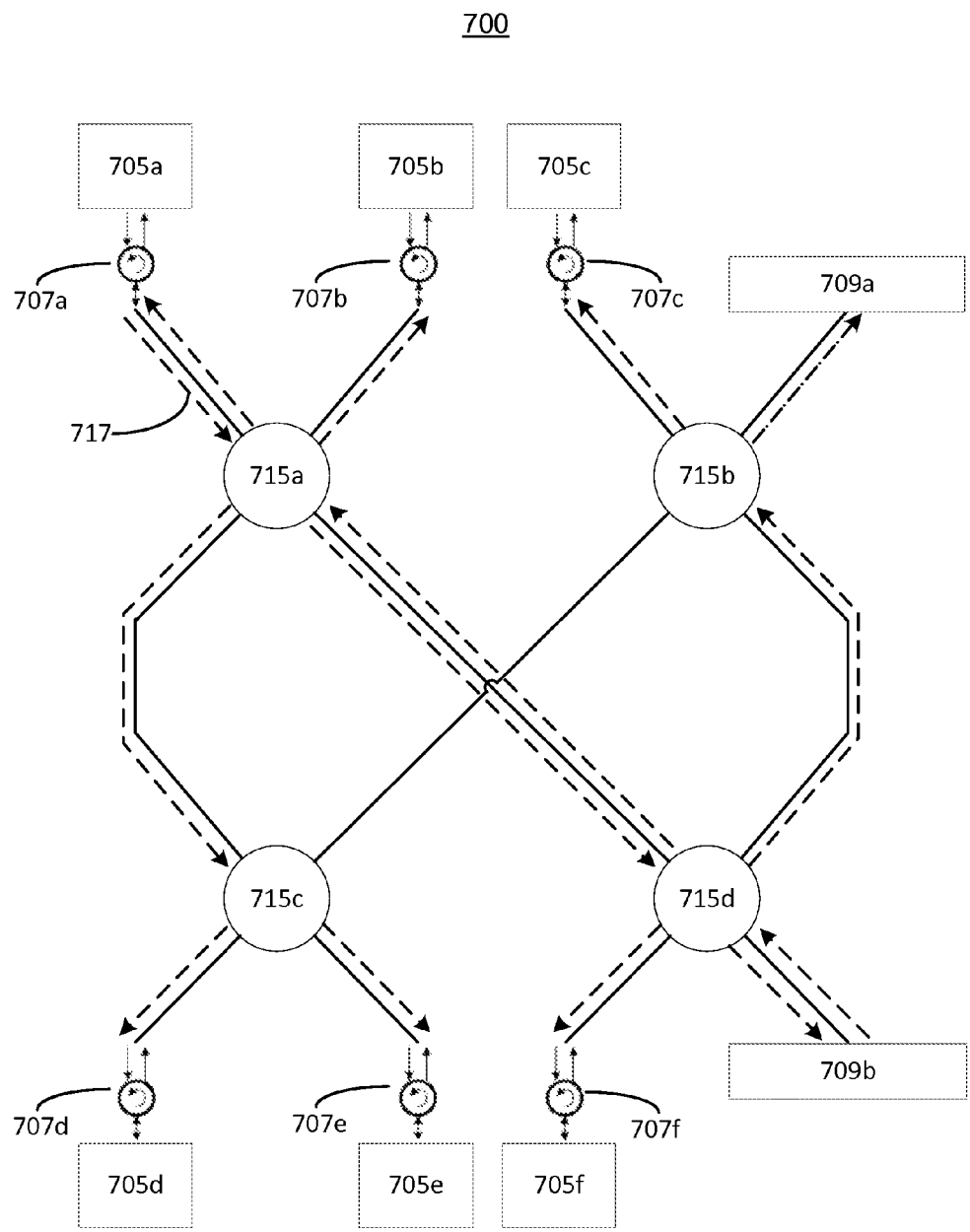
FIG. 7 is a second example computer network including four passive optical splitters.

FIG. 7 is a second example computer 700 network including four passive optical splitters 715a-715d (generally referred to as passive optical splitters 715). The network also includes six switches 705a-705f (generally referred to as switches 705), six circulators 707a-707f (generally referred to as circulators 707), and two mirrors 709a and 709b (generally referred to as mirrors 709). The optical splitters 715 are coupled to one another in a manner similar to the arrangement of the optical splitters 615 shown in FIG. 6B. For example, a first lower port of the passive optical splitter 715a is coupled to a first upper port of the passive optical splitter 715c. A second lower port of the passive optical splitter 715a is coupled to a first upper port of the passive optical splitter 715d. A first lower port of the passive optical splitter 715b is coupled to a second upper port of the passive optical splitter 715c. A second lower port of the passive optical splitter 715b is coupled to a second upper port of the passive optical splitter 715d. This configuration allows the passive optical splitters 715 to logically serve as a single optical splitter having four inputs and four outputs, as discussed above. In some implementations, the network 700 can represent a simplified datacenter network. For example, the switches 705 can represent top-of-rack switches that can be coupled to other computing devices in the datacenter, such as servers.

The switches 705 each couple to a respective port of one of the optical splitters 715 through a respective circulator 707. The circulators permit bidirectional communication between the optical splitters 715 and the switches 705. The mirror 709a is coupled to an upper port of the optical splitter 715b and the mirror 709b is coupled to a lower port of the optical splitter 715d. Each mirror 709 is configured to reflect received optical signals back to the optical splitter 715 from which it was transmitted. The arrangement of switches 705, circulators 707, mirrors 709, and optical splitters 715 allows a signal transmitted by any switch 705 to be received by all other switches 705.

For example, a data signal 717 can be transmitted by the switch 705a to the optical splitter 715a through the circulator 707a. The optical splitter 715a can divide the received signal 717 and output the signal 717 out both of its lower ports (i.e., to the optical splitters 715c and 715d). The splitters 715c and 715d similarly can divide the received signal 717 so that the signal 717 is output from both of their lower ports to the switches 705d, 705e, and 705f, as well as to the mirror 709b. The mirror 709b reflects the signal 717 back to the optical splitter 715d, which again divides the signal 617 and outputs the reflected signal 717 on both of its upper ports to the optical splitters 715a and 715b. The signal 717 is then output by the optical splitters 715a and 715b to the switches 705a-705c through the circulators 707a-707c. Thus, the signal 717 transmitted by the switch 705 is transmitted to all of other switches 705b-705f. In some implementations, the switch 705a can be configured to ignore the signal 717 that it transmitted when the signal 617 is transmitted back to the switch 705a. Signals transmitted by any other switch 705 in the network 700 are similarly received by all other switches 705.

In some implementations, the inclusion of circulators 707 and mirrors 709 can be used to increase the number of ports realized in a network having a given number of optical splitters 707. For example, the network 700 and the network 601 shown in FIG. 6B each include four optical splitters. However, the network 700 can broadcast a signal received from a first switch 705 to five additional switches 705, while the network 600 can transmit a signal received from a first switch to only four additional switches.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus.

A computer readable medium can be, or be included in, a computer-readable storage device, a computer-readable storage substrate, a random or serial access memory array or device, or a combination of one or more of them. Moreover, while a computer readable medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer readable medium is tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer network comprising:
   a first lower level switch having a first port and a second port;
   a second lower level switch having a first port and a second port;
   an upper level switch having a first port directly coupled to the first port of the first lower level switch and a second port directly coupled to the first port of the second lower level switch;
   a first passive optical splitter having a first port coupled to a third port of the upper level switch, a second port coupled to the second port of the first lower level switch, and a third port coupled to the second port of the second lower level switch, the first passive optical splitter configured to transmit signals received at its first port as output signals on both of its second and third ports; and
   a controller coupled to the first lower level switch, the second lower level switch, and the upper level switch, the controller configured to control transmission of data by the first lower level switch, the second lower level switch, and the upper level switch.

2. The computer network of claim 1, wherein the controller is further configured to:
   determine that a data packet transmitted by the upper level switch is intended to be received by the first lower level switch;
   control the upper level switch to transmit the data packet to the first passive optical splitter; and
   control the second lower level switch to ignore network data received from the first passive optical splitter during a time period in which the data packet is transmitted through the first passive optical splitter.

3. The computer network of claim 1, wherein the controller is further configured to:
   control the upper level switch to transmit data packets intended to be received by the first lower level switch to the first passive optical splitter at a first wavelength; and
   control the upper level switch to transmit data packets intended to be received by the second lower level switch to the first passive optical splitter at a second wavelength, different from the first wavelength.

4. The computer network of claim 1 wherein the controller is further configured to:
   control the upper level switch to transmit data packets intended to be received by the first lower level switch to the first passive optical splitter using a first modulation format;
   control the upper level switch to transmit data packets intended to be received by the second lower level switch to the first passive optical splitter using a second modulation format, different from the first modulation format;
   control the first lower level switch to receive data packets from the first passive optical splitter using the first modulation format; and
   control the second lower level switch to receive data packets from the first passive optical splitter using the second modulation format.

5. The computer network of claim 1, wherein the controller is further configured to control the first lower level switch and the second lower level switch to transmit data packets through the first passive optical splitter to the upper level switch by alternately allocating respective transmission time slots to the first lower level switch and the second lower level switch.

6. The computer network of claim 5, wherein the controller is configured to allocate the time slots based on relative bandwidth demands of the first lower level switch and the second lower level switch.

7. The computer network of claim 1, wherein the controller is further configured to control the first lower level switch to transmit data packets through the first passive optical splitter to the upper level switch at a first wavelength and control the second lower level switch to transmit data packets through the first passive optical splitter to the upper level switch at a second wavelength, different from the first wavelength.

8. The computer network of claim 1, wherein the first port of the upper level switch is coupled to the first port of the first lower level switch via a multimode fiber optic cable.

9. The computer network of claim 1, wherein the third port of the upper level switch is coupled to the first passive optical splitter via a single mode fiber optic cable.

10. The computer network of claim 1, wherein the first lower level switch and the second lower level switch are top-of-rack switches in a datacenter.

11. The computer network of claim 1, further comprising a second passive optical splitter, wherein the second port of the first passive optical splitter is coupled to the second port of the first lower level switch through the second passive optical splitter.

12. The computer network of claim 11, further comprising:
a second upper level switch having a first port coupled to a fourth port of the first passive optical splitter.

13. The computer network of claim 12, further comprising a mirror coupled to the second passive optical splitter, wherein the mirror is configured to reflect an optical signal received from the second optical splitter to the second upper level switch through the second passive optical splitter and the first passive optical splitter.

14. A method for transmitting data in a computer network, the method comprising:
transmitting, by an upper level switch, a first data packet to a first lower level switch over a direct communication link;
transmitting, by the upper level switch, a second data packet to the first lower level switch through a first optical splitter coupled to the upper level switch, the first lower level switch, and a second lower level switch by a shared communication link; and
transmitting, by the upper level switch, a third data packet to the second lower level switch through the first optical splitter.

15. The method of claim 14, wherein:
transmitting the second data packet comprises transmitting the second data packet at a first wavelength; and
transmitting the third data packet comprises transmitting the third data packet at a second wavelength, different from the first wavelength.

16. The method of claim 14, further comprising allocating respective transmission time slots to the first lower level switch and the second lower level switch, wherein:
transmitting the second data packet to the first lower level switch occurs during a time slot allocated to the first lower level switch; and
transmitting the third data packet to the second lower level switch occurs during a time slot allocated to the second lower level switch.

17. The method of claim 16, further comprising:
determining relative bandwidth demands of the first lower level switch and the second lower level switch; and
allocating the respective transmission time slots to the first lower level switch and the second lower level switch based on the determined relative bandwidth.

18. The method of claim 14, further comprising transmitting, by the upper level switch, a fourth data packet to the first lower level switch through the first optical splitter and a second optical splitter coupled to the first lower level switch.

19. A computer-readable medium having instructions encoded thereon which, when executed by one or more processors, cause the processors to perform a method comprising:
transmitting, by an upper level switch, a first data packet to a first lower level switch over a direct communication link;
transmitting, by the upper level switch, a second data packet to the first lower level switch through an optical splitter coupled to the upper level switch by a shared communication link; and
transmitting, by the upper level switch, a third data packet to a second lower level switch through the optical splitter.

20. The computer-readable medium of claim 19, wherein:
transmitting the second data packet comprises transmitting the second data packet at a first wavelength; and
transmitting the third data packet comprises transmitting the third data packet at a second wavelength, different from the first wavelength.

21. The computer-readable medium of claim 19, wherein:
transmitting the second data packet comprises transmitting the second data packet first modulation format; and
transmitting the third data packet comprises transmitting the third data packet using a second modulation format, different from the first modulation format.

* * * * *